Sept. 29, 1959     E. R. MARTIN     2,906,935
MOTOR CONTROL ASSEMBLY
Filed July 2, 1956     2 Sheets-Sheet 1

INVENTOR.
EDWIN R. MARTIN
BY
Dybvig and Jacox
HIS ATTORNEYS

Sept. 29, 1959  E. R. MARTIN  2,906,935
MOTOR CONTROL ASSEMBLY
Filed July 2, 1956
2 Sheets-Sheet 2

INVENTOR.
EDWIN R. MARTIN
BY
Dybvig & Jacox
HIS ATTORNEYS

United States Patent Office 2,906,935
Patented Sept. 29, 1959

2,906,935

MOTOR CONTROL ASSEMBLY

Edwin R. Martin, Dayton, Ohio, assignor, by mesne assignments, to Standard Dayton Corporation, Dayton, Ohio, a corporation of Ohio Application July 2, 1956, Serial No. 595,538

10 Claims. (Cl. 318—211)

This invention relates to a motor control assembly. The invention relates more particularly to a motor control assembly for use with a motor which has internal electrical braking components. The invention relates more particularly to a motor control assembly for use in connection with a motor constructed according to the invention disclosed in the Noodleman Patent No. 2,637,059. However, the invention is not so limited due to the fact that the motor control assembly of this invention may be used with other types of motors and with other types of electrical apparatus.

In a motor, such as a motor built according to the invention disclosed in the Noodleman Patent No. 2,637,059, it is desirable in the operation of the motor to control the energization of the braking winding so that the braking winding is automatically deenergized when the rotor of the motor is at zero speed.

An object of this invention is to provide a motor control assembly which may be used to automatically cause rapid deceleration of a motor.

Another object of this invention is to provide a motor control assembly which automatically causes a motor to stop when the main running winding is deenergized.

Another object of the invention is the provision of a motor control assembly which is automatically deenergized when the motor reaches zero speed.

Other objects and advantages reside in the construction of parts, the combination thereof, the mode of operation, and the method of manufacture, as will become more apparent from the following description.

Figure 1:
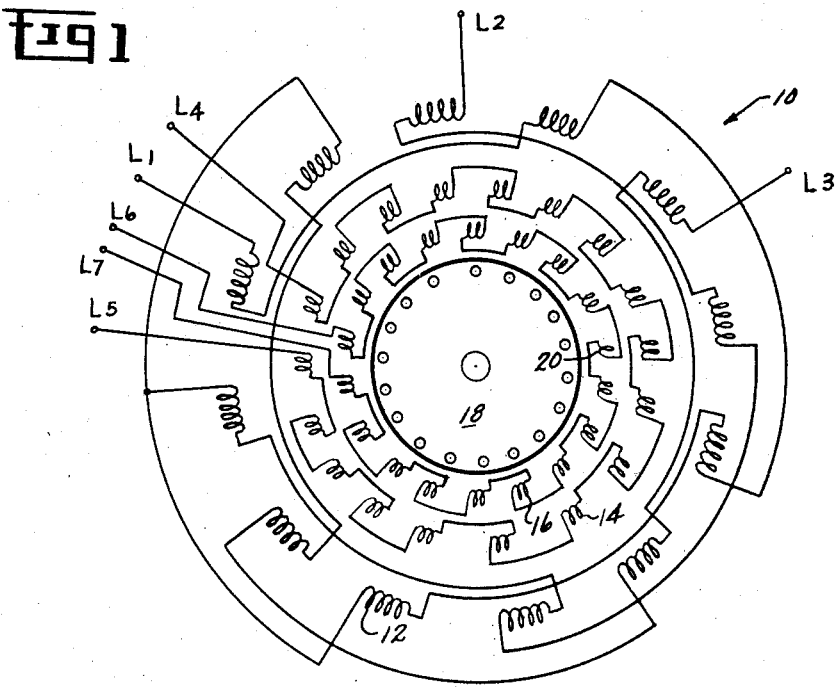
Figure 1 is a schematic diagram of a stator and rotor of a motor the operation of which may be controlled by a control assembly of this invention.
Figure 2:
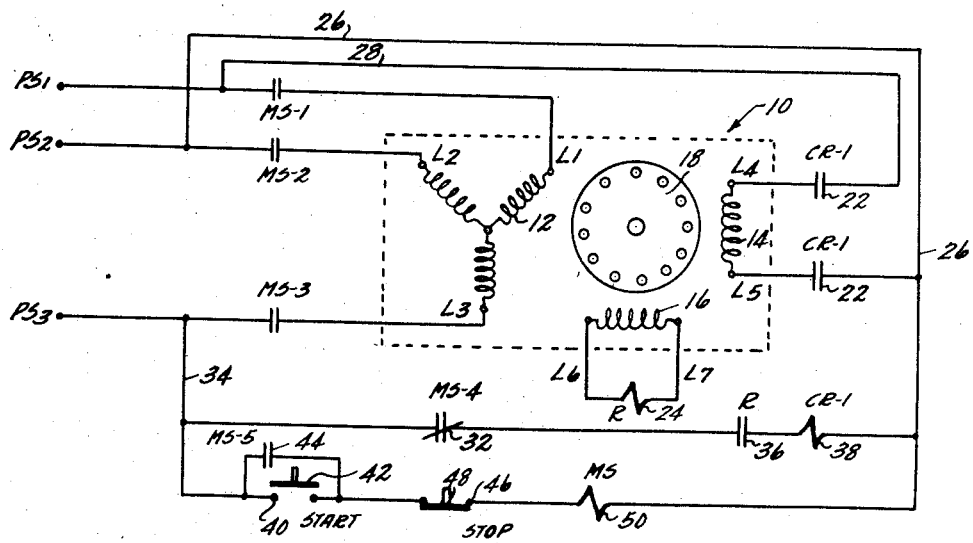
Figure 2 is a schematic circuit diagram showing a motor control assembly of this invention.
Figure 3:
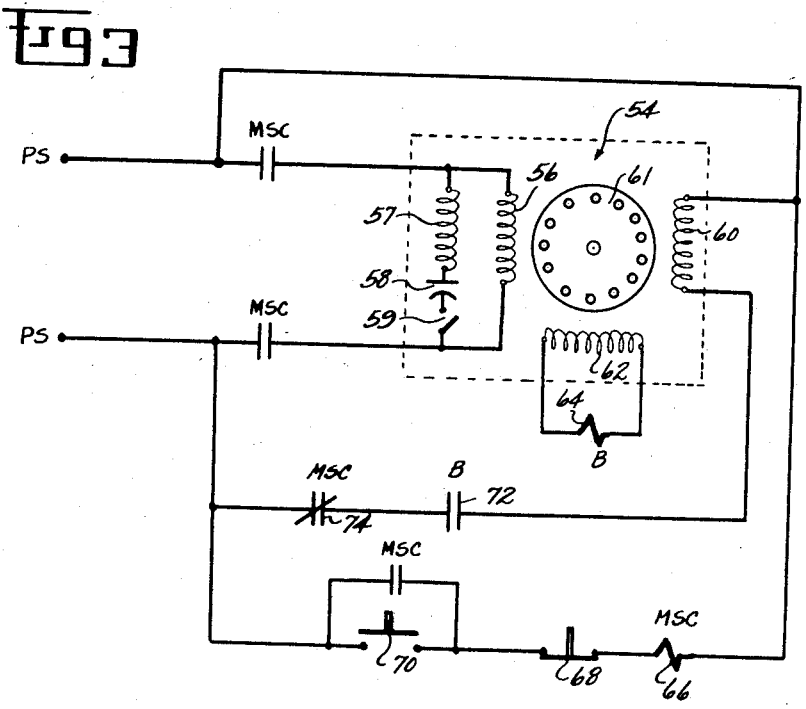
Figure 3 is a schematic circuit diagram showing a modification of a motor control assembly of this invention.
Figure 4:
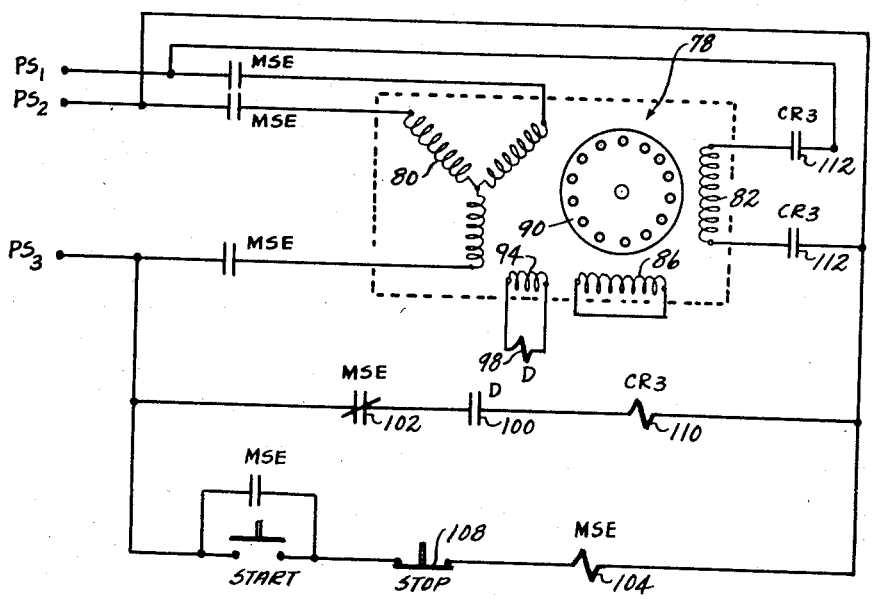
Figure 4 is a schematic circuit diagram showing another modification of a motor control assembly of this invention.

Referring to the drawings in detail, for purposes of illustration, a motor control assembly of this invention is shown in Figures 1, 2 and 4, in connection with a three-phase Y connected motor; and in Figure 3 the invention is shown in connection with a single-phase motor. It is to be understood, however, that the invention is equally applicable to other types of electric machines, such as three-phase delta connected motors and other types of electric motors.

A motor control assembly of this invention is shown in Figures 1 and 2 in connection with a motor 10, which is provided with a main stator winding or running winding 12 and an auxiliary stator winding 14. The motor 10 is also provided with a third winding or complementary winding 16. The winding 16, in combination with the winding 14, forms a two-phase winding which is disposed in the same stator slots provided for the main stator winding 12. The winding 16 is discussed below in greater detail.

The motor 10 is also provided with a rotor 18 which is herein shown as being a squirrel cage rotor. However, it is to be understood that a wound rotor or other type of rotor may also be used in such a motor.

Thus, the motor 10 may be similar to a motor built according to the Noodleman Patent No. 2,627,059. As discussed in the said patent, the arrangement of the windings such as the windings 14 and 16 is such that they establish a field having a larger number of poles than the number of poles produced by the main stator winding 12.

By virtue of the arrangement of the stator windings, the synchronous speed of the motor 10 energized by the running winding or main stator winding 12 may be several times as great as the synchronous speed of the motor 10 when energized solely through the auxiliary winding 14.

When the auxiliary winding 14 is energized, the current flow within the winding 16, induced through rotation of the rotor 18, becomes of sufficient value to cause rapid deceleration of the rotor 18, and causes the rotor 18 to stop.

In motors of the type disclosed by the aforesaid Noodleman patent, a third winding such as the winding 16, is substantially so wound that the algebraic sum of all the voltages induced by the main winding 12 is zero. However, herein the motor 10 has at least one coil of the winding 16, such as the coil 20 shown in Figure 1, so wound as to be slightly unbalanced. Therefore, a slight voltage is induced in the winding 16 during energization of the main winding 12. The unbalance in winding 16 may be produced by providing a coil in the winding which has a different number of turns from the turns in the other coils or the winding 16 may have one of the coils thereof wound in a reverse direction from the direction which it would be wound for a balanced winding. Preferably, the winding 16 is unbalanced to such an extent that approximately 1 to 5 volts are induced therein during energization of the main winding 12.

In Figure 2 power supply lines PS1, PS2 and PS3 are shown supplying electrical energy to the main running winding 12 which is provided with leads L1, L2 and L3. A master switch MS having contactors MS–1, MS–2 and MS–3 connect lines L1, L2 and L3 to power supply lines PS1, PS2 and PS3, respectively.

The auxiliary winding 14 has leads L4 and L5 which are connected to any two of the power supply lines. Herein the auxiliary winding 14 is shown as being connected to power supply lines PS1 and PS2 by means of normally-open relay contacts 22 of a control relay herein referred to as control relay CR1.

Control line 26 connects from power supply line PS2 through one of the contacts 22 to lead L5 of the winding 16. Control lead 28 connects from power supply line PS1 through the other contact 22 to lead L4 of the winding 14. The third stator winding 16 is provided with leads L6 and L7 which connect to an operating coil 24 of a control relay R.

The master switch MS is provided with a normally-closed interlock MS–4, herein referred to by reference numeral 32. The interlock MS–4 is connected to power supply line PS3 by means of a control lead 34. In series with the interlock MS–4 is a normally-open contact 36 of the relay R, which is provided with the operating coil 24. In series with the contact 36 of the relay R is an operating coil 38 of the relay CR1. The operating coil 38 is also connected to power supply line PS2 through the control lead 26.

Also connected to the control lead 34 is a start switch 40 provided with a push button 42. Connected across the start switch 40 is an interlock MS–5 of the master switch MS which is referred to herein by reference numeral 44. The interlock 44 is normally-open and is used to "seal in" across the start switch 40 after the push button 42 is operated.

In series with the start switch 40 is a stop switch 46 provided with a push button 48. In series with the stop switch 48 is an operating coil 50 of the master switch MS. The operating coil 50 operates master switch members MS–1, MS–2, MS–3, MS–4 and MS–5.

The operation of the control assembly as disclosed in Figure 2 is as follows: When the start switch 42 is depressed, the operating coil 50 of the master switch MS is energized. Energization of the operating coil 50 closes the contactors MS–1, MS–2 and MS–3. Energization of the operating coil 50 also opens interlock 32 and closes interlock 44. When interlock 44 is closed, the control circuit is "sealed in" across the start switch 40 so that the push button 42 may be released.

Closing of MS–1, MS–2, and MS–3 energizes the main running winding 12. Thus, the rotor 18 is caused to rotate. Naturally, the speed of rotation of the rotor 18 depends upon the number of poles established by the main running winding 12.

As the main running winding 12 is energized, the slight unbalance in the third winding 16 caused by the coil 20, as discussed above, causes a sufficient voltage to energize the operating coil 24 of the relay R. Energization of the operating coil 24 causes the contact 36 to close. However, the operating coil 38 of the relay CR1 is not at that time energized. This is due to the fact that the interlock 32 or MS–4 is open while the operating coil 50 is energized. Thus, during the running operation by means of the main winding 12 the normally-open relay contacts 22 of the relay CR1 remain open so that the auxiliary winding 14 remains deenergized.

When the push button 48 of the stop switch 46 is depressed, the operating coil 50 of the master switch MS is deenergized. This causes contactors MS–1, MS–2 and MS–3 to open and causes interlock MS–4 to close while interlock MS–5 opens. The contact 36 of the relay R does not immediately open upon deenergization of the winding 12. Thus, the time of the energized closed position of the contact 36 overlaps into the time of the deenergized closed position of the contact 32. Therefore, when interlock MS–4 closes, the operating coil 38 of the control relay CR1 is energized. This causes relay contacts 22 to close, energizing the auxiliary winding 14. Energization of the auxiliary winding 14 causes a flux to be established in the rotor 18. The rotating rotor 18 thus induces a voltage in the third winding 16. Therefore, the operating coil 24 remains energized. Thus, the operating coil 24 causes the contact 36 to remain closed, maintaining energization of the auxiliary winding 14, until the voltage across the third winding 16 approaches zero value. In other words, when the auxiliary winding 14 is energized, the current flow within the third winding 16, induced through rotation of the rotor 18, becomes of sufficient value to cause rapid deceleration of the rotor 18 and causes the rotor 18 to stop. As the rotor 18 approaches zero speed, the voltage induced across the third winding 16 approaches a value of zero. Thus, the operating coil 24 of the control relay R is deenergized, permitting the contact 36 to open. Opening of the contact 36 results in deenergization of the operating coil 38 of the control relay CR1 so that the contacts 22 are permitted to open. When the contacts 22 open, the auxiliary winding 14 is deenergized.

Thus, it is understood that by pressing the push button 42, the motor 10 is operated; by depressing the stop switch 46, the rotor 18 is rapidly brought to a stop, and the auxiliary winding 14 is automatically deenergized.

Figure 3 shows a modification of the motor control assembly of this invention. The circuit of Figure 3 may be used with smaller sizes of motors. However, it is to be understood that such a circuit may also be used with larger types of motors. Reference numeral 54 in Figure 3 refers to a motor which is shown herein provided with a single-phase main running winding 56 and a starting winding 57 having a capacitor 58 and a speed switch 59 in series therewith to aid in providing starting torque. The motor 54 is provided with a rotor 61. The motor 54 also has an auxiliary winding 60 similar to the auxiliary winding 16 shown in Figures 1 and 2. A third winding 62 is disposed in quadrature with respect to the auxiliary winding 60 so that the windings 60 and 62 cooperably establish a braking effect upon the rotor 58 when the winding 60 is energized.

The third winding 62 is slightly inductively coupled with respect to the main running winding 56 in a manner as discussed above with respect to windings 12 and 16. Connected across the third winding 62 of the motor 54 is an operating coil 64 of a control relay B. A master switch MSC is used to energize the main running winding 56. The master switch MSC is provided with an operating coil 66 which is in series with a stop switch 68 and a start switch 70. Operation of the circuit shown in Figure 3 is similar to the operation of the circuit shown in Figure 2 except that a normally-open contact 72 of the relay B has a normally-closed interlock 74 of the master switch MSC in series therewith. These contacts 72 are directly in series with the auxiliary winding 60 for energization thereof from power supply lines PS. Thus, a control relay such as a control relay CR1 shown in Figure 2 is not required.

Figure 4 shows a modification in the stator windings of a braking type of motor. In Figure 4 a motor 78 is provided with a main running winding 80 and an auxiliary winding 82 which are similar to the main running winding 12 and auxiliary winding 14, respectively, of Figure 2. A third winding 86 is disposed 90 electrical degrees with respect to the auxiliary winding 82 and forms a two-phase winding with the auxiliary winding 82. The third winding 86 is non-inductively wound with respect to the main winding 80 and is shown herein as being shorted.

The motor 78 is provided with a rotor 90. The motor 78 also includes a fourth stator winding 94 which preferably has a small number of turns and is inductively wound with respect to the main running winding 80 and is inductively wound with respect to the third winding 86. The stator winding 94 may be referred to as a control winding due to the fact that an operating coil 98 of a control relay D is connected to the winding 94. Thus, when the main running winding 80 is energized from power supply lines PS1, PS2, and PS3 by means of a master switch MSE, as shown, the stator winding 94 is energized, causing energization of the operating coil 98 of the control relay D. This causes closing of a normally-open contact 100 of the control relay D which has a normally-closed contact 102 of the master switch MSE in series therewith. The contact 102 opens when an operating coil 104 of the master switch MSE is energized. Thus, when a stop button 108 in series with the operating coil 104 of the master switch MSE is depressed, the contact 102 closes causing energization of an operating coil 110 of a control relay CR3. The control relay CR3 is provided with normally-open contacts 112 which close upon energization of the operating coil 110.

Thus, when the main running winding 80 is energized by operation of the master relay MSE, the stator winding 94 has voltage induced therein which energizes the operating coil 98 of the relay D. This causes the contact 100 to close, but since the contact 102 opens with operation of the master switch MSE, the operating coil 110 remains deenergized. However, when the stop button 108 is depressed the contact 102 closes with opening of the MSE contactors which connect to the main winding 80. Thus, the coil 110 of the relay CR3 is energized through contacts 102 and 100 and the contacts 112 are closed. This energizes the auxiliary winding 82.

When the auxiliary winding 82 is energized, the winding 86 becomes energized through rotation of the rotor 90. Thus, the rotor 90 is quickly stopped. Due to the fact that the control winding 94 is inductively wound with respect to the third winding 86, the control winding 94 is energized during energization of the third winding 86. Therefore, when the rotor 90 is brought to a stop, the control winding 94 is deenergized causing deenergization of the operating coil 98 of the relay D. With deenergization of the coil 98 of the relay D the contact 100 opens deenergizing operating coil 110 of the relay CR3, permitting the contacts 112 to open, deenergizing the auxiliary winding 82. Thus, all of the portions of the control assembly are deenergized.

Thus, from a description of the preferred embodiment and the modifications, it is to be understood that by means of a control assembly of this invention a motor may be automatically and quickly stopped and the braking circuits automatically deenergized.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a control assembly for a motor of the type provided with a stator, a rotor, a main stator winding arranged to establish a given number of poles, the combination comprising an auxiliary stator winding arranged to establish a different number of poles for braking operation, a third stator winding wound with respect to the main stator winding so that a voltage in the order of 1 to 5 volts is induced across the third stator winding during energization of the main stator winding, there being at least one coil of the third stator winding provided with a different number of turns from the number of turns of the other coils of the third stator winding, said third stator winding being disposed 90 degrees electrically with respect to the auxiliary stator winding, a first relay, the first relay having an operating coil connected across the third stator winding, the first relay having a normally-open contact for connecting the auxiliary stator winding to a source of electrical energy, master switch means for connecting the main stator winding to a source of electrical energy, normally-closed switch means in series with said normally-open contact and operable with said master switch means so that the auxiliary stator winding is energized after the main stator winding is deenergized and until the third stator winding is deenergized.

2. In a control assembly for a motor having a stator, a rotor, a main stator winding arranged to establish a given number of poles, the combination comprising an auxiliary stator winding arranged to establish a different number of poles, a third stator winding, the auxiliary stator winding and the third stator winding being disposed 90 degrees electrically one with respect to the other so that a current is induced in the third stator winding through rotation of the rotor when the auxiliary stator winding is energized, the third stator winding being only slightly inductively coupled with respect to the main stator winding, the third stator winding being slightly unbalanced with respect to the main stator winding, there being at least one coil of the third stator winding provided with a different number of turns from the number of turns of the other coils of the third winding, a first relay, the first relay having an operating coil connected to the third stator winding for energization thereby, master switch means for connection of the main stator winding to a source of electrical energy, the first relay having a normally-open switch connecting the auxiliary stator winding to a source of electrical energy, and a normally-closed switch in series with said normally-open switch and operable with the master switch, the rotor thus being caused to rotate by the main stator winding, the main stator winding also causing energization of the operating coil of the first relay, the operating coil of the first relay also being energized during stopping operation through energizing of the auxiliary stator winding through rotation of the rotor.

3. In a control assembly for a motor of the type provided with a stator, a rotor, a main stator winding arranged to establish a given number of poles, the combination comprising an auxiliary stator winding arranged to establish a different number of poles for braking operation, a third stator winding displaced 90 degrees electrically with respect to the auxiliary stator winding, the third stator winding being slightly inductively wound with respect to the main stator winding so that there is a small voltage across the third stator winding when the main stator winding is energized, there being at least one coil of the third stator winding provided with a different number of turns from the number of turns of the other coils of the third stator winding, a source of electrical energy, a main contactor having normally-open switch members connecting the main stator winding to the source of electrical energy, a first relay, a second relay, the first relay including an operating coil for operation thereof and connected across the third stator winding, the second relay including a normally-open switch connecting the auxiliary winding to the source of electrical energy, a pair of control conductors connected to the source of electrical energy, the main contactor including an operating coil for operation of the switch members thereof, the operating coil being connected to one of the control conductors, a normally-open start switch connected to the operating coil in series therewith, a normally-closed stop switch connected to the other control conductor and also connected to the start switch in series therewith, a normally-open interlock operable by the operating coil of the main contactor and connected across the start switch, a normally-closed switch operable by the operating coil of the main contactor and connected to one of the control conductors, a normally-open switch of the first relay connected to the normally-closed switch, an operating coil of the second relay connected to the other control conductor and connected in series relation the the normally open switch of the first relay.

4. A motor and control assembly, a source of electrical energy, the motor including a stator, a rotor, a running winding in the stator for operation of the rotor, an auxiliary winding in the stator, a third stator winding, the auxiliary winding and the third stator winding serving as a braking winding for the rotor, a third stator winding being in electrical quadrature with the auxiliary winding, the third stator winding being wound so that a voltage is induced thereacross during energization of the running winding, the third stator winding also being wound so that a voltage is induced thereacross during energization of the auxiliary winding with rotation of the rotor, there being at least one coil of the third stator winding provided with a different number of turns from the number of turns of the other coils of the third stator winding, means connected to the third stator winding and responsive to energization thereof for connecting the auxiliary winding to the source of electrical energy, switch means for connecting the running winding to the source of electrical energy, and means operable with said switch means for disconnecting the auxiliary winding from the source of electrical energy during energization of the running winding.

5. In a control assembly for a motor having a stator, a rotor, a main stator winding arranged to establish a given number of poles, the combination comprising an auxiliary stator winding arranged to establish a different number of poles, a third stator winding, the auxiliary stator winding and the third stator winding being disposed in electrical quadrature so that a current for braking operation is induced in the third stator winding through rotation of the rotor when the auxiliary stator winding is energized, there being at least one coil of the third stator winding provided with a different number of turns from the number of turns of the other coils of the third stator winding, the third stator winding thus being slightly unbalanced with respect to the main winding so that a voltage is induced across the third stator winding during energization of the main stator winding, a first relay, the first relay having an operating coil connected across the third stator winding for energization thereby, master switch means for connection of the main stator winding to a source of electrical energy, the first relay having a normally-open switch connecting the auxiliary stator winding to a source of electrical energy, and a normally-closed switch in series with said normally-open switch and operable with the master switch, the rotor thus being caused to rotate by the main stator winding, the main stator winding also causing energization of the operating coil of the first relay, the operating coil of the first relay also being energized during braking operation through energization of the auxiliary stator winding through rotation of the rotor, energization of the third winding during braking operation thus being dependent upon the speed of the rotor so that when the rotor reaches zero speed the third stator winding is deenergized and thus the first relay is deenergized causing deenergization of the auxiliary stator winding.

6. In a control assembly for a motor of the type provided with a stator, a rotor, a main stator winding arranged to establish a given number of poles, the combination comprising an auxiliary stator winding arranged to establish a different number of poles for braking operation, a third stator winding wound with respect to the main stator winding so that a small voltage is induced across the third stator winding during energization of the main stator winding, there being at least one coil of the third stator winding provided with a different number of turns from the number of turns of the other coils of the third stator winding, said third stator winding being disposed electrically angularly with respect to the auxiliary stator winding and energized with energization of the auxiliary stator winding, switch means for connection of the auxiliary stator winding to a source of electrical energy, control means connected across the third stator winding and energizable thereby for operation of said switch means, master switch means for connecting the main stator winding to a source of electrical energy, contact means operable by the master switch means and connected to said control means for maintaining the switch means in open position when the master switch means is closed, the contact means also permitting the control means to close the switch means when the master switch means is open, the auxiliary stator winding thus being energized immediately after the main stator winding is deenergized and until the normally-open contact is opened by deenergization of the third stator winding.

7. An electrical apparatus comprising an induction motor having a stator and a rotor, the stator having a main winding arranged to establish a given number of poles, the stator also having a brake winding arranged to establish a different number of poles, a portion of the brake winding being slightly inductively coupled with respect to the main winding, there being at least one coil of said portion of the brake winding having a different number of turns from the number of turns of the other coils of said portion of the brake winding, switch means connected to the other portion of the brake winding for connection thereof to a source of electrical energy, control means connected across at least a section of the first said portion of the brake winding which includes said one coil thereof, the control means being operably connected with said switch means.

8. In a control assembly for a motor having a stator and a rotor, a main stator winding arranged to establish a given number of poles, an auxiliary stator winding arranged to establish a different number of poles, a third stator winding, the auxiliary stator winding and the third stator winding being disposed 90 degrees electrically one with respect to the other so that a current is induced in the third stator winding through rotation of the rotor when the auxiliary stator winding is energized, the third stator winding being only slightly inductively coupled with respect to the main stator winding, the third stator winding being slightly unbalanced with respect to the main stator winding, there being at least one coil of the third stator winding provided with a different number of turns from the number of turns of the other coils of the third winding, and control means connected across the third stator winding and operably connected to the auxiliary stator winding for controlling energization thereof in response to energization and deenergization of the main stator winding and in response to operation of the rotor.

9. In a control assembly for a motor of the type provided with a stator and a rotor and a main stator winding arranged to establish a given number of poles, an auxiliary stator winding arranged to establish a different number of poles for braking operation, a third stator winding wound with respect to the main stator winding so that a small voltage is induced across the third stator winding during energization of the main stator winding, said third stator winding being disposed 90 degrees electrically with respect to the auxiliary stator winding, there being at least one coil of the third stator winding provided with a different number of turns from the number of turns of the other coils of the third stator winding, master switch means for connecting the main stator winding to a source of electrical energy, normally closed switch means operable with said master switch means, an operating coil connected across the third stator winding, means operable by said operating coil including means in series with said normally closed switch means for energizing the auxiliary stator winding after the main stator winding is deenergized and until the third stator winding is deenergized.

10. In a control assembly for a motor having a stator, a rotor, a main stator winding arranged to establish a given number of poles, an auxiliary stator winding arranged to establish a different number of poles, a third stator winding, the auxiliary stator winding and the third stator winding being disposed in electrical quadrature so that a current for braking operation is induced in the third stator winding through rotation of the rotor when the auxiliary stator winding is energized, there being at least one coil of the third stator winding provided with a different number of turns from the number of turns of the other coils of the third stator winding, the third stator winding thus being slightly unbalanced with respect to the main winding so that a voltage is induced across the third stator winding during energization of the main stator winding, a first relay, the first relay having an operating coil connected across the third stator winding for energization thereby, master switch means for connection of the main stator winding to a source of electrical energy, means operable in response to energization of the first relay for connecting the auxiliary stator winding to a source of electrical energy, and a normally closed switch in series with said means and operable with the master switch, the rotor thus being caused to rotate by the main stator winding, the main stator winding also causing energization of the operating coil of the first relay, the operating coil of the first relay also being energized during braking operation through energization of the auxiliary stator winding through rotation of the rotor, energization of the third stator winding during braking operation thus being dependent upon the speed of the rotor so that when the rotor reaches zero speed the third stator winding is deenergized and thus the means operable in response to energization of the first relay is deenergized causing deenergization of the auxiliary stator winding.

References Cited in the file of this patent

UNITED STATES PATENTS

| | | |
|---|---|---|
| 2,627,059 | Noodleman | Jan. 27, 1953 |
| 2,779,906 | Adriansen | Jan. 29, 1957 |
| 2,828,457 | Noodleman | Mar. 25, 1958 |
| 2,829,328 | Seeger | Apr. 1, 1958 |